United States Patent
Jung et al.

(10) Patent No.: US 6,940,604 B2
(45) Date of Patent: Sep. 6, 2005

(54) THIN-FILM INSPECTION METHOD AND DEVICE

(75) Inventors: Boo Yong Jung, Kyungki-do (KR); Dae Cheol Lim, Kyungki-do (KR); Kyung Gu Kim, Kyungki-do (KR)

(73) Assignee: LG Electronics Inc., Seoul (KR)

( * ) Notice: Subject to any disclaimer, the term of this patent is extended or adjusted under 35 U.S.C. 154(b) by 305 days.

(21) Appl. No.: 10/271,757

(22) Filed: Oct. 17, 2002

(65) Prior Publication Data

US 2003/0090669 A1 May 15, 2003

(30) Foreign Application Priority Data

Oct. 18, 2001 (KR) ........................................ 2001-64202

(51) Int. Cl.[7] ............................ G01B 9/02; G01B 11/28
(52) U.S. Cl. .................... 356/503; 356/511; 356/630
(58) Field of Search ................................ 356/485, 489, 356/492, 495, 511, 512, 503, 504, 630, 632, 517

(56) References Cited

U.S. PATENT DOCUMENTS

| | | | |
|---|---|---|---|
| 5,042,949 A | * | 8/1991 | Greenberg et al. .......... 356/451 |
| 5,333,052 A | | 7/1994 | Finarov |
| 5,502,564 A | * | 3/1996 | Ledger ........................ 356/503 |
| 5,936,254 A | * | 8/1999 | Aiyer et al. .............. 250/559.4 |
| 6,501,545 B2 | * | 12/2002 | Komuro et al. .......... 356/237.2 |

* cited by examiner

Primary Examiner—Gregory J. Toatley, Jr.
Assistant Examiner—Patrick Connolly
(74) Attorney, Agent, or Firm—Greenblum & Bernstein, P.L.C.

(57) ABSTRACT

Disclosed is a thin-film inspection device with two or more light sources. This device can control the wavelength and intensity of light and illuminate the lights with different incident angles, and are used to control the interference intensity, thereby determining optimal inspection conditions to obtain a reliable inspection result even when different kinds of thin films coexist. The thin films are formed on a flat plate and have different indices of refraction and thicknesses. An incident light control unit is disposed between the illumination unit and the flat plate for controlling the light to be incident on the patterns. A sensor unit detects a reflection light from the patterns. A reflection light control unit is disposed between the flat plate and the sensor unit and controls the light to be detected by the sensor unit. A control unit controls the movement of the illumination unit and the sensor unit.

16 Claims, 8 Drawing Sheets

T=1700Å°

T=2800A°

T = 1700Å°

T=2800A°

THIN-FILM INSPECTION METHOD AND DEVICE

BACKGROUND OF THE INVENTION

1. Field of the Invention

The present invention relates to a method and a device for inspecting thin films which are widely employed in a semiconductor manufacturing process, and more particularly to a method and a device for inspecting thin films wherein the surfaces of the thin films are inspected using an optical interference phenomenon, thereby allowing the inspection irrespective of the kind of film.

2. Description of the Related Art

Thin-film inspection is very important in manufacturing products such as LCD and PDP that use semiconductor processing mainly composed of processes of deposition, exposure, and etching. In the case of TFT LCD, thin films with thicknesses less than 1000 Å are piled up to form a pattern. Presence/absence and shortage/excess of the pattern or contamination by foreign substances have a serious influence on the resulting product. Accordingly, it is necessary to inspect the thin film for forming the pattern. As semiconductor processing methods have developed, various methods of inspection have been proposed. Most of the inspection methods can be classified into several types as follows.

Among them, the most general method is an inspection method that uses an optical system including a CCD 11 and an illuminator 12 a shown in FIG. 1. In this method, light from the illuminator 12 is uniformly illuminated from various incident angles to an inspection target 10, and thereby images of the inspection target are obtained, not depending on the change of the thickness of the inspection target, a scratch or a minute projection thereon. Generally, this method is used to perform two-dimensional measurement of the pattern, rather than to inspect the pattern. It is general to use a LED as a light source in order to provide uniform and wide range of illumination.

However, this optical system is not suitable for detecting minute defects or determining inspection conditions on the pattern, or for performing a high-speed inspection using a linear CCD because an illuminator suitable for an area CCD is used.

In addition, there is an inspection method using a coaxial incident illumination. In this method, as shown in FIG. 2, a coaxial incident illuminator 21 and an inclined illuminator 22 are fixed at appropriate disposition-angles to illuminate light to the surface of an inspection target 20 so as to obtain an image thereof via a CCD 23.

When this method is used, optimal inspection conditions closely depend on the characteristics of the thin-film pattern, but it is very difficult to adjust these conditions. The only adjustable inspection-condition is the brightness of the coaxial and inclined illuminators. Therefore, when there are different kinds of patterns, or the characteristics of the pattern are changed, the optimal inspection condition cannot be obtained. In addition, even in the same process, it is necessary to adjust inspection conditions in response to different process conditions. This inspection method cannot meet such needs.

Further, Orbotech co. proposed a thin-film inspection method that uses an optics technology called "Ellipsometry". This method was disclosed in U.S. Pat. No. 5,333,052. An inspection device used in this method includes a polarizer 31, a retardation plate 32, and an analyzer 33. Light emitted from an illuminator 35 is linearly polarized through the polarizer 31 and irradiated to the surface of an inspection target 30. Elliptically-polarized light reflected from the inspection target 30 is linearly polarized again through the analyzer 32. Thereafter, the linearly-polarized light is incident on a CCD sensor 34 whereby an image of the inspection target is obtained. As a result, this method has an advantage in that the inspection sensitivity is maximized for a particular type of film, and the brightness of a thin film can be adjusted for emphasis of the thin film by changing the rotation angles of the retardation plate and analyzer.

That is, this inspection method has an advantage in that because the brightness can be adjusted by changing the rotation angles of the retardation plate 32 and the analyzer 33, inspection conditions can be changed according to the characteristics of the film. However, when there are two or more films having different properties, this method cannot determine one inspection condition suitable for all the various kinds of properties of films. As a result, if inspection conditions for a specific thin film are optimized, inspection conditions for a different thin film are degraded.

Consequently, the prior art thin-film inspection methods have problems that it is difficult to set an inspection condition when there are various kinds of thin films, and therefore their optimal inspection conditions become different under a particular condition, lowering the reliability of the inspection result.

That is, the prior art thin-film inspection methods use one illuminator, or various kinds of light sources at the same time as needed for inspecting the surface of the inspection target to meet a specific requirement, or use an old optical instrument such as Ellipsometry for the inspection. However, the prior arts are very difficult to increase the relative sensitivity between patterns, and do not have an appropriate adjustment method for heterogeneous patterns.

SUMMARY OF THE INVENTION

Therefore, the present invention has been made in view of the above problems, and it is an object of the present invention to provide a method and a device for inspecting a thin film wherein two or more light sources, which can control the wavelength and intensity of light and illuminate the lights with different incident angles, are used to control the interference intensity, thereby determining optimal inspection conditions to obtain a reliable inspection result even when there are different kinds of thin films.

In accordance with the present invention, the above and other objects can be accomplished by the provision of a thin-film inspection device comprising:

a flat plate on which patterns having different indices of refraction and thicknesses are formed;

an illumination unit for illuminating light to the patterns, the illumination unit being able to vary illumination angle of the light;

an incident light control unit disposed between the illumination unit and the flat plate for controlling the light to be incident on the patterns;

a sensor unit for detecting a reflection light from the patterns;

a reflection light control unit disposed between the flat plate and the sensor unit for controlling the light to be detected by the sensor unit; and a control unit for controlling movement of the illumination unit and the sensor unit.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
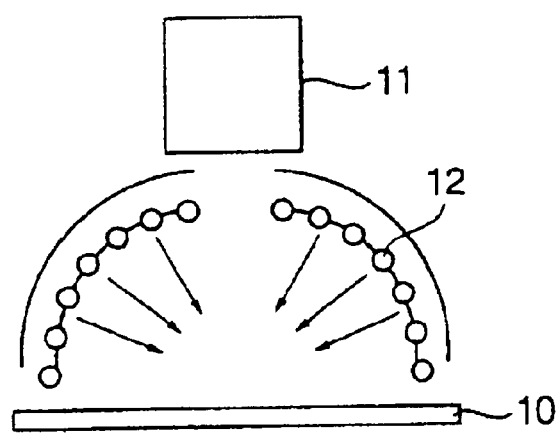
FIG. 1 is a view schematically showing a general optical system.
Figure 2:
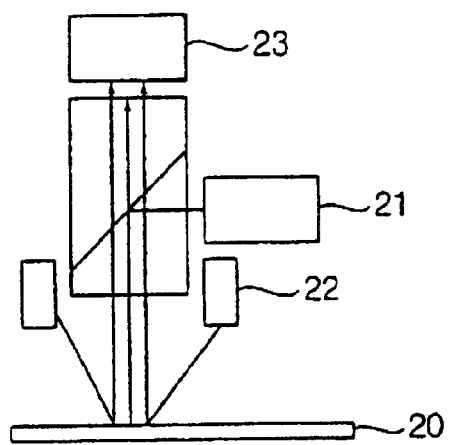
FIG. 2 is a view schematically showing a conventional illumination unit for thin-film inspection.
Figure 3:
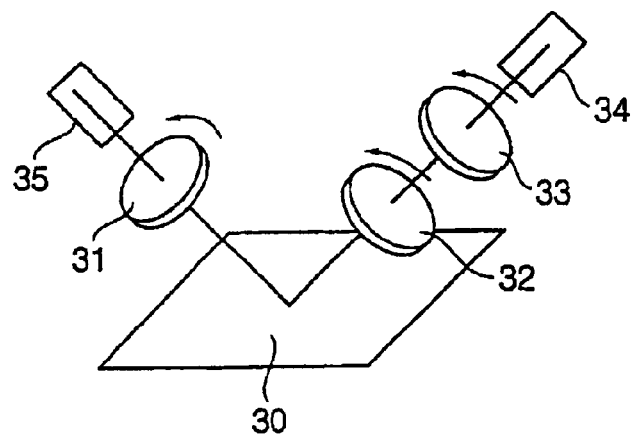
FIG. 3 is a view showing a prior art optical system using an elliptical polarizer.

Hereinafter, an embodiment of the present invention is described in detail referring to the drawings.

A thin-film inspection method according to the present invention includes a step of irradiating lights at different incident angles toward a flat plate, on which thin films with different thickness and indices of refraction are formed, using a plurality of independent light sources; a step of detecting interference light reflected from the thin films using a sensor; and a step of analyzing the detected light to obtain analysis information, so as to determine the state of the thin films.

In the light illumination step, it is possible to perform a real-time control of the irradiation angle and wavelength of the illuminated light, and to control the incident angle of the light by the horizontal movement of the movement of the light source.

In the light detection step, an image sensitivity of a particular material can be controlled by selectively detecting the wavelengths of the reflected light obtained by controlling the light source.

That is, the irradiated light, whose incident axis deviates from the central axis of the light source by horizontally moving the light source, is reflected from the flat plate on which the thin films are formed, or is refracted to enter the films. The refracted light is diffracted to form a bright or dark band image corresponding to the rim of the pattern, thereby obtaining a highlighted image representing the image of the substance.

One of the methods for obtaining the highlighted image utilizes the principle of bevel illumination microscope. In this method, in order to clarify the shape of an object to be observed, light is irradiated to deviate slightly from the optical axis of the microscope.

On the other hand, in the thin-film inspection method, the light sources and the sensor are disposed to face each other so as not to overlap the path of the light from the light sources to the flat plate with the path of the light from the flat plate to the sensor.

Figure 4:
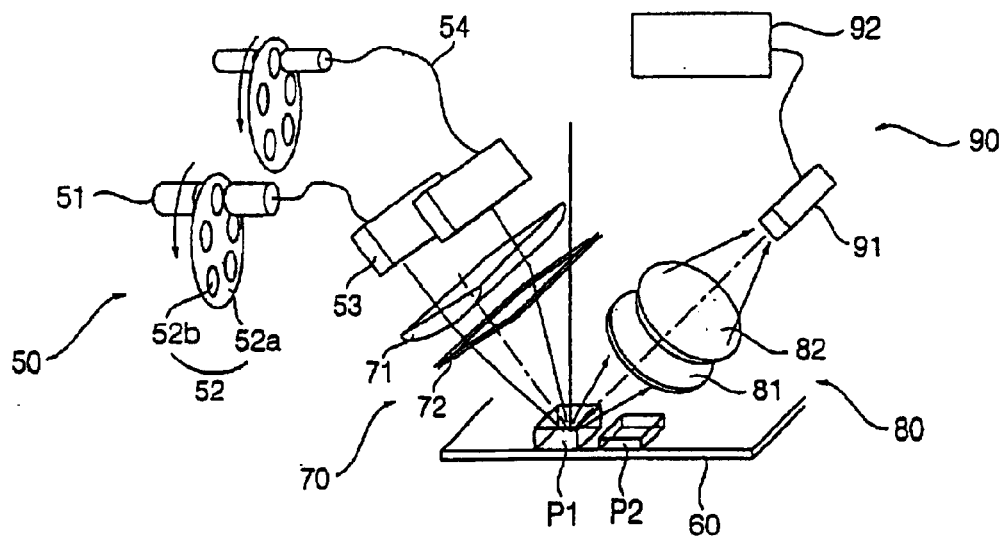
FIG. 4 is a view showing a thin-film inspection device according to the present invention.

FIG. 4 is a perspective view showing the configuration of the thin-film inspection device according to the present invention.

As shown in FIG. 4, the thin-film inspection device includes a flat plate 60 on which patterns P1 and P2 composed of thin films are formed, an illumination unit 50 including light sources that irradiate light at a predetermined angle toward the patterns P1 and P2 and function to change the irradiation angle of the light, and an incident light control unit that is disposed between the illumination unit 50 and the flat plate 60 to control the light to be incident on the patterns P1 and P2. This device also includes a censor unit 90 for detecting light reflected from the patterns P1 and P2, a reflection light control unit 80 disposed between the flat plate 60 and the sensor unit 90 for controlling the light that is reflected from the patterns P1 and P2 and is to be detected by the sensor unit 90, and a control unit (not shown) for controlling the movements of the illumination unit 50 and the sensor unit 90.

Here, the illumination unit 50 and the sensor unit 90 are disposed to obliquely face each other so as to transfer light emitted from the illumination unit 50 to the sensor unit 90 without causing any overlap between the incident light path and the reflected light path.

In addition, the illumination unit 50 is disposed movably in the horizontal direction with respect to the optical axis, so that the incident angle of the light incident on the incident light control unit can be controlled using the movement of the illumination unit 50.

The illumination unit 50 includes at least two light sources 51 with a function to control the wavelength and intensity of the light. Wavelength modulation means 52 are disposed in front of the light sources 51, through which light emitted from the light sources 51 is transmitted and its wavelength is modulated.

The modulated light is incident on a collimating lens 53 and then irradiated vertically to the incident light control unit 70. Here, a light path adjustment system is disposed to adjust the path of light emitted from the wavelength modulation means 52 in order to guide the light to the collimating lens 53.

The wavelength modulating means 52 includes a wheel 52a rotatably disposed in front of the light source, and color filters 52b disposed on the wheel 52a in a ring arrangement. Light emitted from the light sources 51 passes through the color filters 52b, modulating the wavelength of the light.

Preferably, the light path adjusting system is composed of an optical fiber 54 connected between the front of the wavelength modulating means 52 and the rear of the collimating lens 53, or at least one reflection mirror.

Light emitted from the light source 51 is refracted or reflected via the optical fiber 54 or the reflection mirror, respectively, and then transferred to the collimating lens 53.

The incident light control unit 70 disposed in front of the collimating lens 53 controls the wavelength or intensity of the light irradiated to the pattern. In more detail, the incident light control unit 70 includes a first refracting lens 71 and an incident filter 72. The first refracting lens 71 refracts light emitted from the illumination unit 50, so that the refracted light is irradiated at a straight line on the patterns P1 and P2. The incident filter 72 is disposed between the first refracting lens 71 and the flat plate 60 to control the light incident on the patterns P1 and P2.

The first refracting lens 71 is composed of a lens having a half cylinder form that has a flat light-entering surface and a convex light-exiting surface. Therefore, when the light is incident on the refracting lens 71, the light is not refracted, but when the light exits the refracting lens 71, the light is refracted.

In addition, the incident filter 72 may be a general filter of neutral density having no polarization property, or a polarizer having a polarization property that can change the polarization state of the light passing therethrough.

The sensor unit 90 includes a linear sensor 91 and an AD converter 92. The linear sensor 91 is movable horizontally and detects light reflected from the patterns P1 and P2. The AD converter 92 digitalizes and displays a signal generated from the linear sensor 91.

The reflection light control unit 80 includes a second refracting lens 82 and a detection filter 81. The second refracting lens 82 is disposed between the linear sensor 91 and the flat plate 60 to concentrate the reflected light to the linear sensor 91. The detection filter 81 is disposed between the second refracting lens 82 and the patterns P1 and P2 to control the quantity of measurable light.

The collimating lens 53 and the linear sensor 91 are disposed to obliquely face each other. The light source 51 can be made of an optical fiber or an end light element extended in one direction. The color filter wheel 52a is rotated manually or by a motor, allowing easy modulation of the wavelength of the incident light. The collimating lens 53 and the linear sensor 91 are moved horizontally using a driving device that is driven by a controller (not shown).

The second refracting lens 82 is composed of a half-sphere convex lens with a convex light-entering surface and a flat light-exiting surface, whereby the incident light is refracted to be concentrated to the center.

On the other hand, it is preferable to form the detection filter 81 like the incident filter 72. That is, the detection filter 81 is made of a general filter of neutral density having no polarization property, or a polarizer that can change the polarization of the light passing therethrough.

In the thin-film inspection device having such a configuration, when inspecting a flat plate on which different kinds of thin films are formed, inspection conditions can be controlled via the following procedure.

While passing through the color filter 52b of the wavelength modulating means 52, light emitted from the light source 51 is changed in wavelength and transferred to the collimating lens 53 via the optical fiber 54. Then, the collimating lens irradiates the light to the patterns P1 and P2 on the flat plate 60 via the first refracting lens 71 and the incident filter 72. The first refracting lens 71 serves to refract the incident light to be irradiated at a straight line on the flat plate. The incident filter 72 controls the quantity of light to be incident on the patterns P1 and P2. The light reflected from the patterns P1 and P2 passes through the detection filter 81 and the second refracting lens 82, sequentially, to reach the linear sensor 91. The linear sensor 91 detects the light, and the AD converter 92 digitalizes and displays the detected signal.

The wheel 52a of the wavelength modulation means 52 is rotated to change the color filter through which the light passes, thereby modulating the wavelength of the light. The collimating lens 53 is moved along a straight line by a motor (not shown) to finely control the incident angles of the light incident on the patterns P1 and P2. In addition, the linear sensor 91 is also moved by a linear motor (not shown) to detect the reflected light. The optimal inspection condition can be determined based on the position of the collimating lens 53 and the wavelength of the incident light determined by the color filter 52b.

Hereinafter, the operation of the thin-film inspection device and method of the present invention is described in more detail, together with its theoretical principle.

Figure 5:
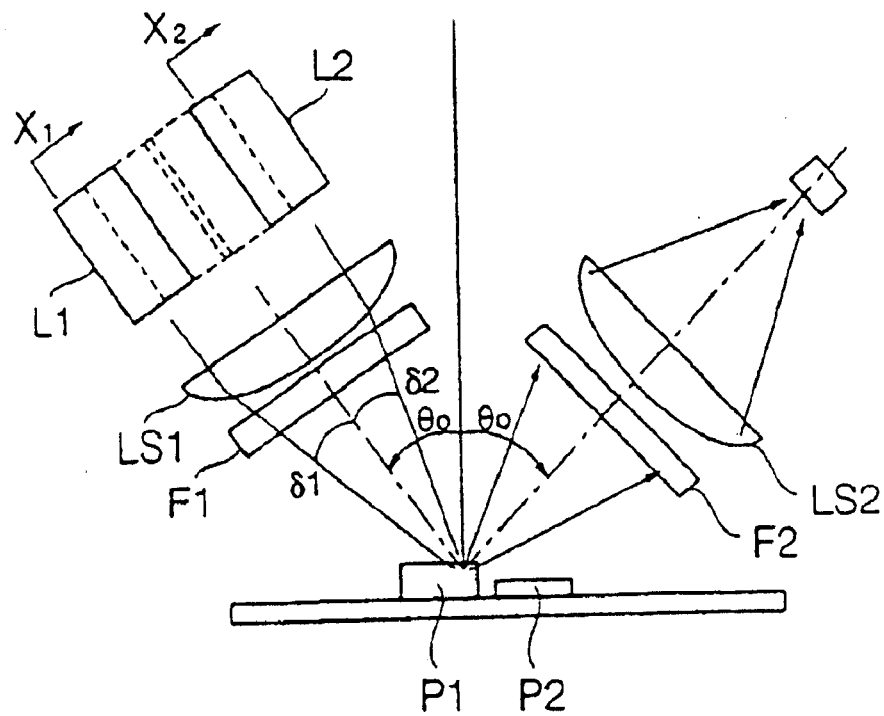
FIG. 5 is a view illustrating a technology used in the present invention.
Figure 6:
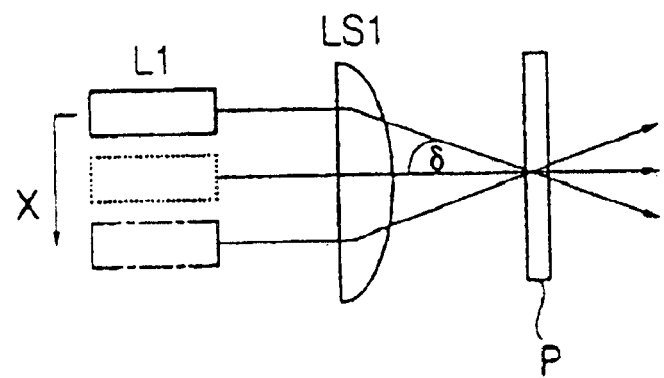
FIG. 6 is a conceptual view illustrating the key point of the technique used in the present invention.

FIG. 5 is a conceptual view illustrating a technique used in the present invention, and FIG. 6 is a conceptual view illustrating the key point of the technique used in the present invention. These figures show that two or more light sources, which can control the wavelength and intensity of light and illuminate the lights at different incident angles, are used to control the interference intensity, thereby determining optimal inspection conditions.

A thin film formed on a flat plate with uniform thickness is called "pattern". Reference symbols P1 and P2 in FIG. 5 indicate two patterns, respectively, with different thicknesses and indices of refraction. As patterns have different thicknesses and indices of refraction, they have different interferences. Reference symbols L1 and L2 indicate light sources, respectively. Each light source can adjust the light irradiation path using the reflection mirror or the optical fiber, and has a specific wavelength characteristic, or can adjust the wavelength using the filter.

LS1 indicates a half-cylinder convex lens with a flat light-entering surface and a convex light-exiting surface, and LS2 indicates a half-sphere convex lens with a convex light-entering surface and a flat light-exiting surface.

Lights from the light sources L1 and L2 are collimated at an angle $\theta_0$ from a vertical line perpendicular to the inspection surface of the pattern, where the angle $\theta_0$ can be adjusted differently according to the inspection target. The collimated lights are concentrated to a straight line on the inspection surface through the half-cylinder lens LS1. The censor and the illuminator are disposed to obliquely face each other, so as not to overlap the incident light path with the reflected light path.

In addition, the interference degree between the internal reflection light (Ix) and the external reflection light (Iy) can be adjusted by adjusting the irradiation angle with respect to the surface of the pattern.

Meanwhile, FIG. 6 illustrates a principle that the incident angle is changed according to the light collimation position determined by the horizontal movement of the light sources L1 and L2. Incident light parallel to the optical axis passes by the focus point of the lens LS1. Light entering the edge portion of the lens is incident on the surface of the inspection target with a large refraction angle, and light entering the center of the lens is incident on the surface of the object with no refraction angle.

Figure 7:
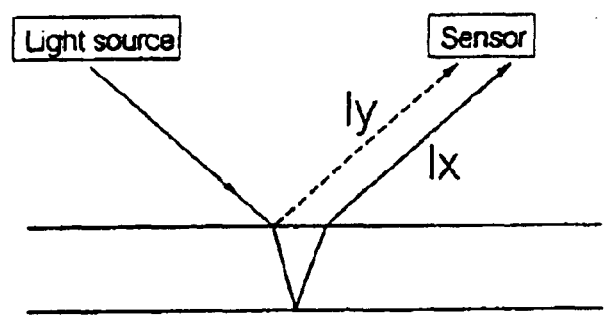
FIG. 7 is a conceptual view illustrating the light traveling path in the present invention.
Figure 8A:
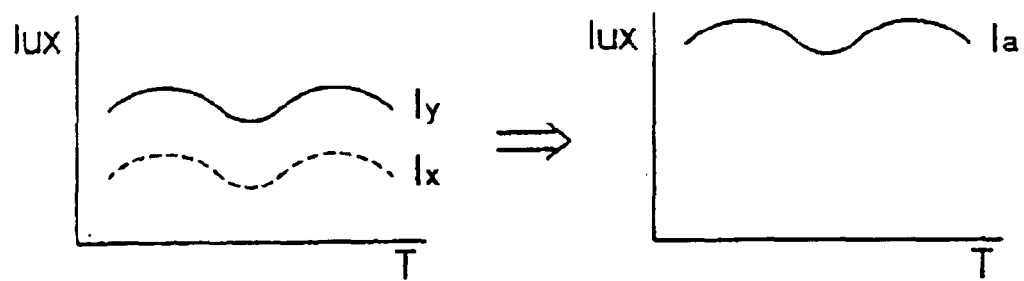
FIGS. 8a and 8b are graphs illustrating constructive and destructive interferences, respectively.
Figure 8B:
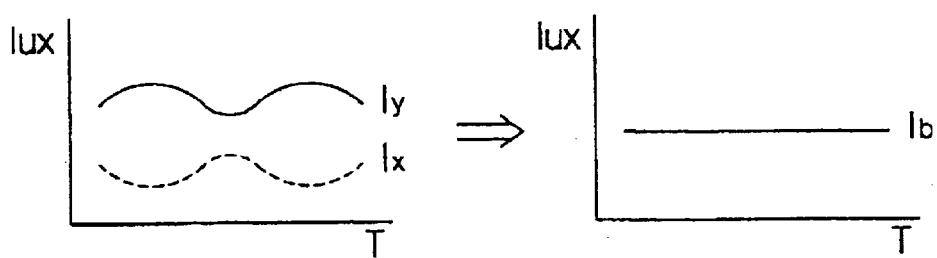

FIG. 7 is a conceptual view illustrating the light traveling path in the present invention. FIGS. 8a and 8b are graphs illustrating constructive and destructive interferences, respectively.

That is, light irradiated to the surface of the pattern is split into two reflection lights, one being the external light and the other the internal light, which travel along different paths. The interference degree between the two reflection lights differs according to the incident angle. Namely, according to the phase states of the two reflection lights, the interference degree differs, that is, the resulting light becomes brighter or darker as shown in FIGS. 8a and 8b.

In more detail, when the internal reflection light Ix and the external reflection light Iy with the same wavelength and the same phase are reflected from the surface of the pattern, they interfere constructively according to the light superposition principle. On the contrary, when the two lights Ix and Iy with the same wavelength and opposite phases are reflected from the surface of the pattern, they interfere destructively according to the light superposition principle.

The quantity of light incident on the pattern can be controlled by controlling the brightness of the light source or by using the filter. Reference symbols F1 and F2 of FIG. 5 indicate filters that control the quantity of incident light and the quantity of measurable light.

The light sources L1 and L2 can be moved in the directions X1 and X2, and the angles δ1 and δ2 are changed according to the movement distances of the light sources L1 and L2. That is, the incident angle can be accurately controlled with the movement of the light sources L1 and L2.

The present invention provides an optical system that is advantageous in measuring, inspecting, and monitoring the presence/absence, shortage/excess, and thickness variation of thin films, with different thicknesses uniformly, formed on a flat substance, or formed as a pattern thereon. The advantageous measurement conditions are as follows.

(a) Brightness difference between the pattern and the background is sufficiently increased in order to emphasize shortage/excess, and presence/absence of the pattern.

(b) Brightness difference between heterogeneous patterns is sufficiently increased in order to differentiate between regions of the pattern.

(c) The change in the detected light relative to the change in thickness and index of refraction of the pattern is sufficiently elevated.

When light is illuminated with a specific incident angle to a thin dielectric film with a specific thickness formed on the surface of a substance, the average intensity of detectable light and the change ratio of the intensity relative to the thickness can be obtained by the following equation 1.

$$I = Ix + Iy + 2\sqrt{IxIy}\cos(4\pi n_I T \cos\theta_T / \lambda + \pi)$$ Equation 1

$$\delta I/\delta(T) = 8\sqrt{(IxIy)}\pi/\lambda \cdot n_I \cos\theta_{Tx} \cdot \sin(4\pi \cdot n_I T \cdot \cos\theta_{Tx}/\lambda)$$

Here, λ denotes the wavelength of the incident light, $\theta_T$ denotes refraction angle, and Ix and Iy denote the intensities of the internal and external reflection lights, respectively. These variables can be externally adjusted. In addition, T and $n_T$ denote the thickness and index of refraction, respectively. These variables are for the inspection target.

Hereinafter, the conditions (a), (b), and (c) are called "inspection condition". For convenience of analysis, it is assumed that Ix/Iy=1, and an equivalent thickness τ is defined by the following equation 2.

$$\tau = n_1 T$$ Equation 2

In addition, the inspection conditions (a), (b), and (c) can be expressed by the following equation 3.

$$I_m(\theta_{Ix},\lambda)|_{\tau=\tau 1} > I_1, I_m(\theta_{Iy},\lambda)|_{\tau=\tau 2} > I_2$$

$$\delta I/\delta\tau(\theta_{Ix},\lambda)|_{\tau=\tau 1} > Q_1, \delta I/\delta\tau(\theta_{Iy},\lambda)|_{\tau=\tau 2} > Q_2$$

$$|I_1-I_0|>\delta_1, |I_2-I_0|>\delta_2, |I_3-I_0|>\delta_3$$ Equation 3

Here, $I_0$ denotes the quantity of background light, and $I_1$ and $I_2$ are minimum quantities of light required for differentiating the pattern, respectively. $\delta_i$(i=1,2,3) is a constant for defining a value sufficient to obtain a contrast. Constants Q1 and Q2 are minimum change ratios of light-quantity required for detecting the change of the thickness, which is needed to be adjustable sensitively or not as needed. These constants can be determined to a high value if not causing a false defect.

In the prior art, one illuminator is used, various kinds of light sources are used as needed for facilitating the inspection of the surface, or an old optical instrument based on Ellipsometry is utilized for the inspection. These prior art methods are very difficult to increase the relative sensitivity of the pattern, or cannot cope with heterogeneous patterns. When two or more kinds of patterns are formed on a substance, the patterns have different optimal inspection-conditions. Accordingly, in the prior arts, it is difficult to select the values $I_1$, $I_2$, $Q_1$, and $Q_2$ that satisfy the condition of the equation 3, with two variables ($\theta_{TX}$, λ), and the selection is impossible in some cases.

FIGS. 9 to 12 are graphs illustrating simulation results when desired inspection conditions cannot be determined using one illuminator.

Figure 9:
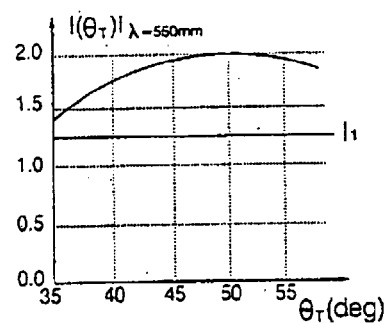
FIG. 9 is a graph illustrating the interference change ratio in the optical system according to the present invention.
Figure 9:
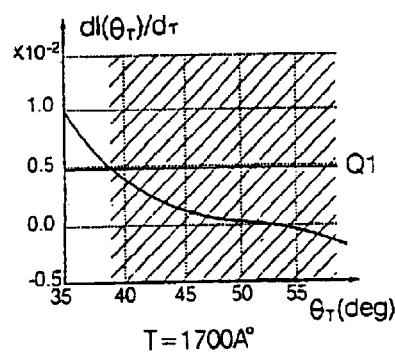
Figure 10:
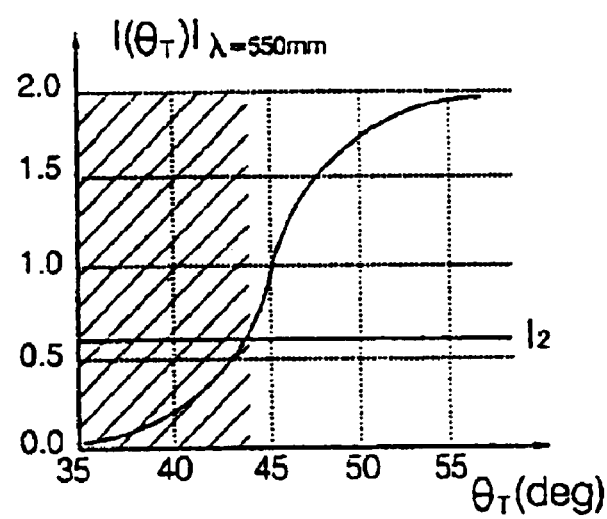
FIG. 10 is a graph illustrating the interference change ratio under a different condition in the optical system according to the present invention.
Figure 10:
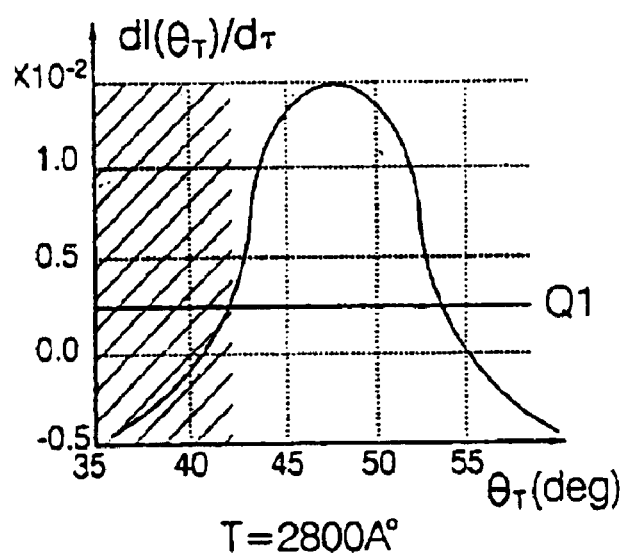

FIGS. 9, and 10 shows the intensity of interference light with respect to the refraction angle, in the case when λ=500 nm and T=1700 Å, and in the case when λ=500 nm and T=2800 Å, respectively. In this simulation, for convenience of analysis, the index of refraction n is fixed at a constant, and T is changed.

When T=1700 Å, as shown in the second graph of FIG. 9, the inspection condition is satisfied when $\theta_T$<38°. However, when T=2800 Å, because of requirement that $I_m$>$I_2$, as shown in FIG. 10, the inspection condition is satisfied when $\theta_T$<41°.

Based on the simulation result, two cases can be considered. One case is when the wavelength is changed to overcome the problems, and the other is when $\theta_T$ is adjusted to a wider range of values. Nonetheless, this method is limited.

$$\theta_1 < \theta_0$$

$$\lambda_{min} < \lambda < \lambda_{max}$$ Equation 4

In the Equation 4, when the index of refraction $\theta_T$ is too large, total reflection can be generated on the surface of the substance, or the instrumental problem occurs. In addition, referring to wavelength-dependent characteristics of commonly-used photo detection sensors, $\lambda_{min}$ is about 400 nm and $\lambda_{max}$ is about 600 nm.

Figure 11:
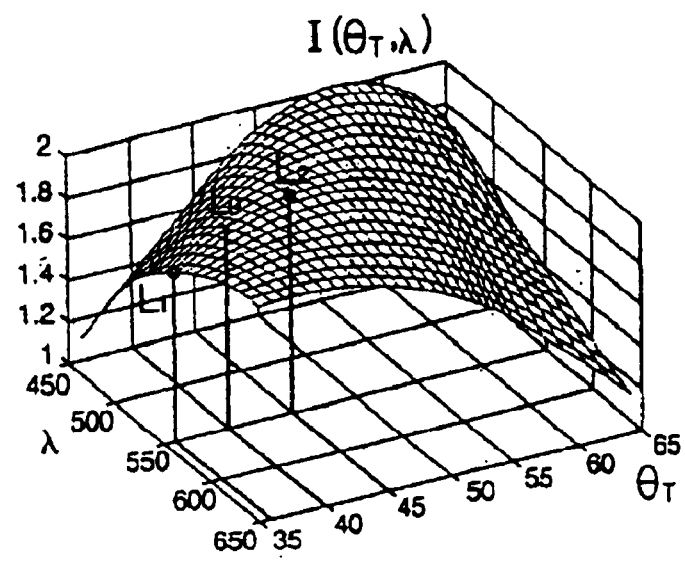
FIG. 11 is a, graph illustrating a simulation result of the optical system according to the present invention.
Figure 11:
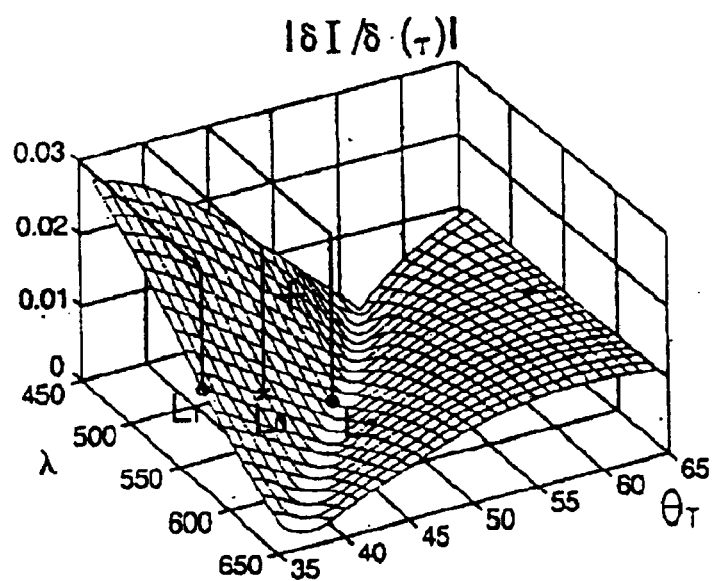
Figure 12:
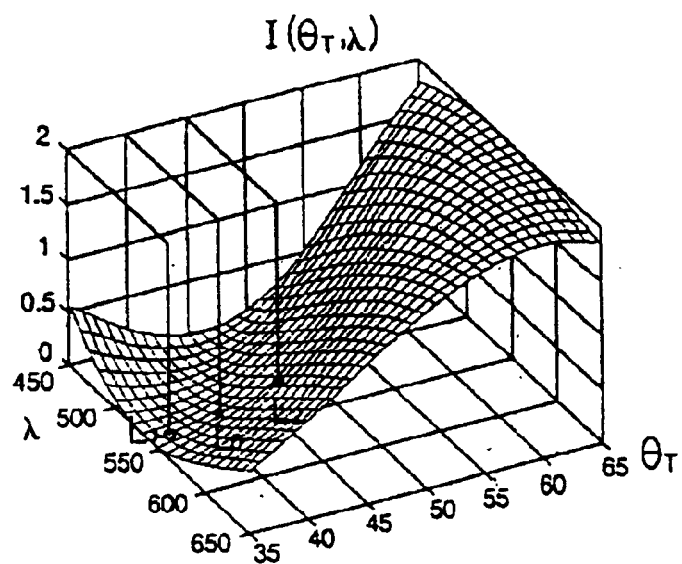
FIG. 12 is a graph illustrating a simulation result under a different condition in the optical system according to the present invention.
Figure 12:
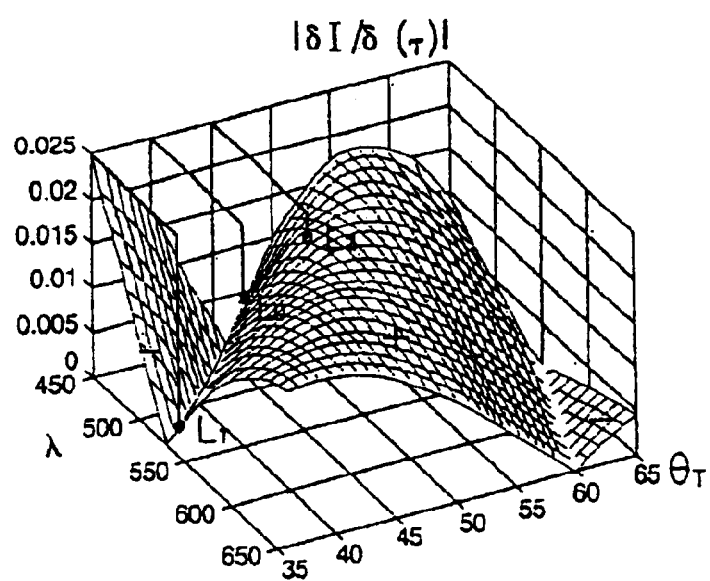

FIGS. 11 and 12 shows intensity of light with respect to (θT, λ), as a simulation result. As can be expected, it is impossible to determine a value (θT, λ) that satisfies the inspection condition described above. Namely, when one illuminator is used, the condition is inevitably determined so as to emphasize, one thin film.

For this reason, the present invention provides a thin-film inspection method wherein at least two separated light sources simultaneously irradiate lights with different incident angles. When two lights with intensities Ix and Ix are incident on the inspection target with different incident angles, there is no interference between the two incident lights, and the measurable intensity of light is given by the following equation 5.

$$Im = Ix + Iy - Ix\cos(4\pi \cdot \tau \cdot \cos\theta_{Tx}/\lambda 2) - Iy\cos(4\pi \cdot \tau \cdot \cos\theta_{Ty}/\lambda)$$
$$= 2 \cdot Ix\sin^2(2\pi \cdot \tau \cdot \cos\theta_{Tx}/\lambda 1) + 2 \cdot Iy\sin^2(2\pi \cdot \tau \cdot \cos\theta_{Iv}/\lambda 2)$$

Equation 5

In addition, the change ratio of Im with respect to τ is given by the following equation 6.

$$\delta I/\delta(\tau) = 4\pi[Ix/\lambda 1 \cdot \cos\theta_{Ix} \cdot \sin(4\pi \cdot \tau \cdot \cos\theta_{Ix}/\lambda 1) + Iy/\lambda 2 \cdot \cos\theta_{Iy} \cdot \sin(4\pi \cdot \tau \cdot \cos\theta_{Iy}/\lambda 2)]$$

Equation 6

As shown in the equations 5 and 6, when a satisfactory inspection condition is selected for one thin film, and a inspection condition is selected for the other thin film in the same manner, the inspection conditions becomes satisfactory for two different patterns.

As shown in simulation results of FIGS. 11 and 12, when lights from light sources L1 and L2 are incident on two patterns of T=1700 Å and T2800 Å with incident angles θT=38o, θT=45o, respectively, and the reflected lights are detected by the same sensor, the brightness and the change ratio that satisfy the inspection condition can be obtained. Similarly, controlling of the incident angles with different-wavelength lights allows increase of the brightness of the two patterns, as well as decrease of the change ratio.

As apparent from the above description, in the thin-film inspection method and device according to the present invention, there are two light sources that can control the wavelength and the intensity of light and illuminate lights with different incident angles so as to control the interference intensity and determine optimal inspection conditions, thereby obtaining a reliable inspection result also when various kinds of thin films are formed on a pattern.

Although the preferred embodiment of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A thin-film inspection method comprising:
    irradiating a plurality of lights to a thin film;
    controlling a wavelength of at least one of the irradiated lights;
    directing the wavelength-controlled light on a spot of the thin film; and
    detecting an interference light reflected from the thin film.

2. The method as set forth in claim 1, wherein the directing step includes controlling an incident angle of the wavelength-controlled light and the spot of the thin film.

3. The method as set forth in claim 2, wherein the controlling step is performed by moving the wavelength-controlled light horizontally.

4. The method as set forth in claim 1, further comprises controlling an intensity of the wavelength-controlled light.

5. A thin-film inspection method comprising:
    irradiating a plurality of lights to a thin film;
    controlling a wavelength of at least one of the irradiated lights;
    adjusting a light path from the wavelength controlled light;
    directing the path-adjusted light on a spot of the thin film; and
    detecting an interference light reflected from the thin film.

6. The method as set forth in claim 5, further comprises controlling an intensity of the wavelength-controlled light.

7. The method as set forth in claim 5, wherein the adjusting step is performed by moving the wavelength-controlled light horizontally.

8. A thin-film inspection device comprising:
    a plurality of light sources each irradiating light to a thin film;
    a wavelength modulator controlling a wavelength of at least one of the irradiated lights;
    a light path control system directing the wavelength-controlled light on a spot of the thin film; and
    a detector detecting an interference light reflected from the thin film.

9. The device as set forth in claim 8, wherein the wavelength modulator includes a rotatable wheel on which a plurality of color filters are disposed.

10. The device as set forth in claim 8, further comprising an optical fiber that delivers a light from the wavelength modulator to the light path control system.

11. The device as set forth in claim 8, wherein the light path control system includes an illuminating unit to control an incident angle of the wavelength-controlled light and the spot of the thin film.

12. The device as set forth in claim 11, wherein the illuminating unit is disposed movably in horizontal direction.

13. The device as set forth in claim 8, wherein the light path control system includes a collimating lens to direct the wavelength-controlled light on the spot of the thin film.

14. The device as set forth in claim 8, further comprises a filter that controls an intensity of the wavelength-controlled light.

15. The device as set forth in claim 14, wherein the filter includes a polarizer filter.

16. The device as set forth in claim 8, further comprising a sensor unit obliquely disposed to the light path control system.

* * * * *